March 23, 1926.

J. E. BINNS 1,577,557

COMBINED SIGNAL AND LICENSE PLATE HOLDER FOR VEHICLES

Filed June 17, 1924   2 Sheets-Sheet 1

Inventor
John E. Binns
Watson E. Coleman
Atty

March 23, 1926.  1,577,557
J. E. BINNS
COMBINED SIGNAL AND LICENSE PLATE HOLDER FOR VEHICLES
Filed June 17, 1924   2 Sheets-Sheet 2
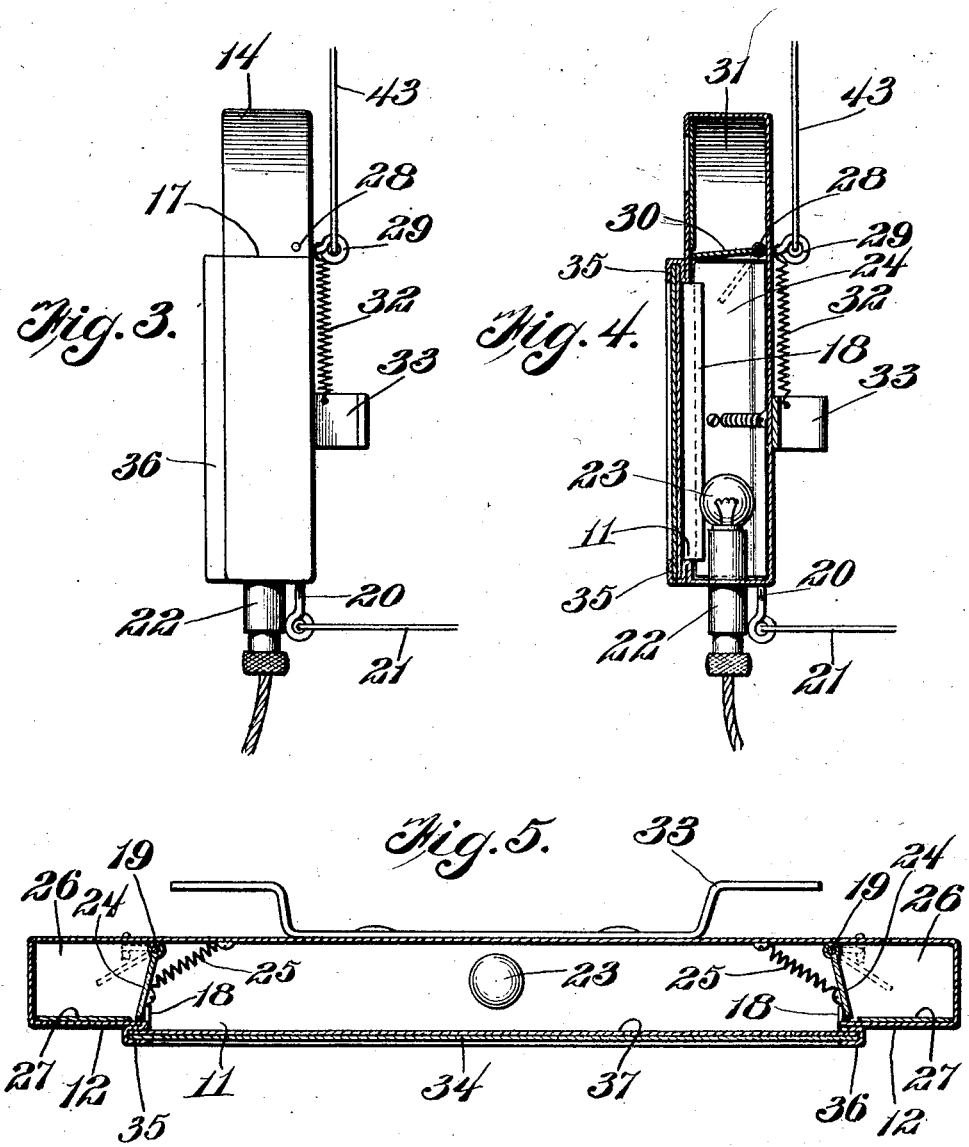
Inventor
John E. Binns
Watson E. Coleman
Atty Patented Mar. 23, 1926.

1,577,557

UNITED STATES PATENT OFFICE.

JOHN E. BINNS, OF NASHVILLE, TENNESSEE, ASSIGNOR OF ONE-HALF TO OSIE E. BELL, OF NASHVILLE, TENNESSEE.

COMBINED SIGNAL AND LICENSE-PLATE HOLDER FOR VEHICLES.

Application filed June 17, 1924. Serial No. 720,590.

*To all whom it may concern:*

Be it known that I, JOHN E. BINNS, a citizen of the United States, residing at Nashville, in the county of Davidson and State of Tennessee, have invented certain new and useful Improvements in Combined Signals and License-Plate Holders for Vehicles, of which the following is a specification, reference being had to the accompanying drawings.

This invention relates to combined signals and license plate holders for vehicles and more particularly to a device of this character in which signals are given automatically.

An important object of the invention is to provide a device of this character in which a single illuminating element suffices both for the illumination of the license indicia and for the illumination of discovered signals.

A still further object of the invention is to provide a device of this character having a main compartment and a plurality of auxiliary compartments communicating with the main compartment, communication with the auxiliary compartments from the main compartment being controlled by shutters automatically actuated from controlling portions of the operating mechanism of the vehicle.

These and other objects I attain by the construction shown in the accompanying drawings, wherein for the purpose of illustration is shown a preferred embodiment of my invention and wherein:—

Figure 3 is a side elevation thereof;

Figure 4 is a vertical transverse section therethrough;

Figure 5 is a horizontal section therethrough.

Figure 1:
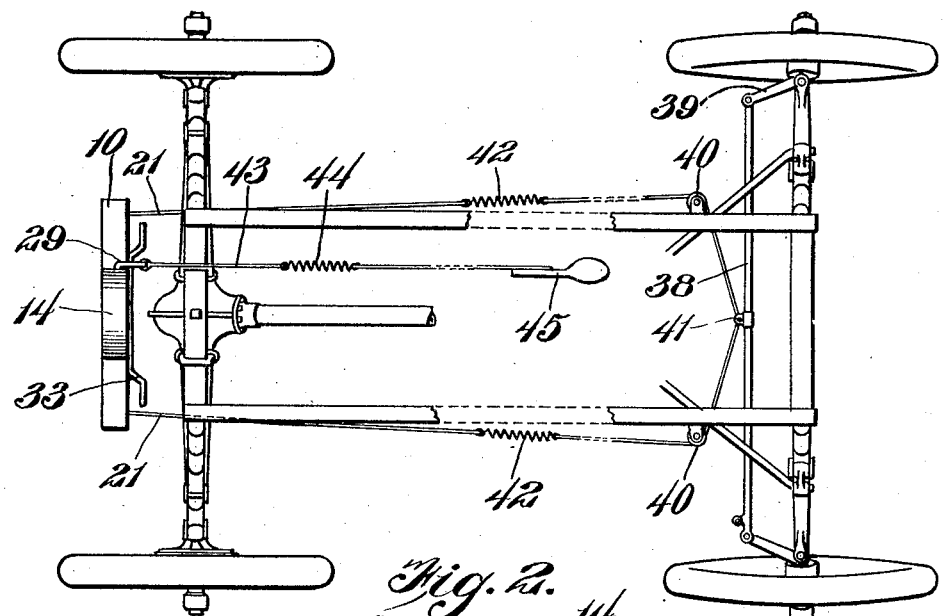
Figure 1 is a plan view of a portion of the chassis of a vehicle showing the connections employed with signals constructed in accordance with my invention.
Figure 2:
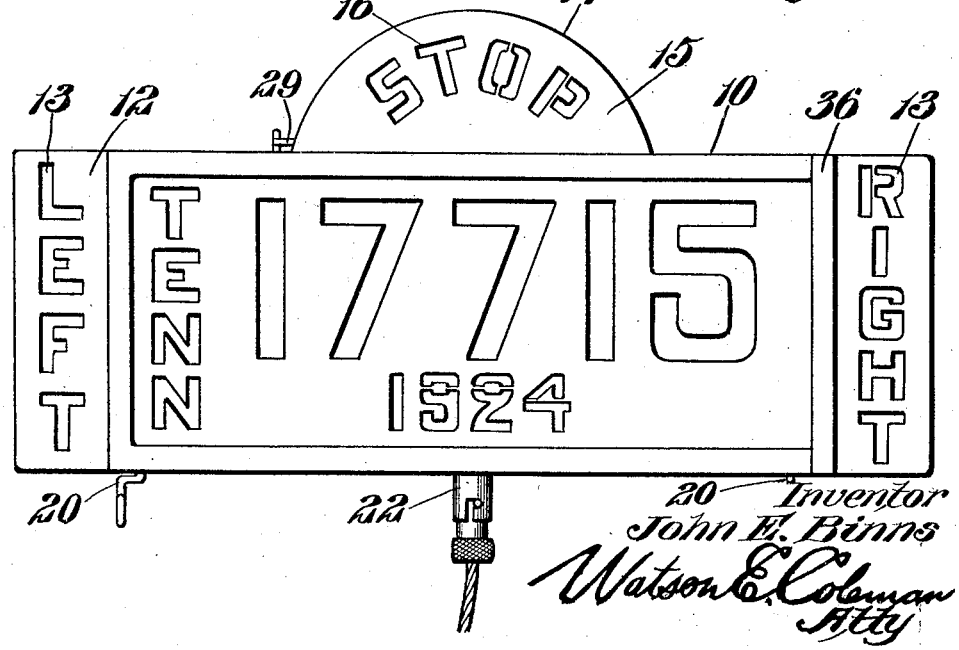
Figure 2 is a rear elevation of the signal.

Referring now more particularly to the drawings, the signal includes a rectangular casing 10 having formed in the rear wall thereof a centrally disposed rectangular opening 11 of less length than the length of the casing and centrally disposed with respect to the casing. The rear wall 12, between the end of the casing and the end edges of this opening, is provided with vertical rows of perforations 13 combining to provide a sensible indication, in the present instance disclosed as the words "Left" and "Right". The upper wall of the casing is provided with an obtrusion 14, the rear wall 15 of which forms a continuation of the rear wall 12 of the casing and has formed therein openings combining to form the word "Stop", as indicated at 16. The entrance to this obtrusion is through the upper wall 17 of the casing, this upper wall being vacated between the lower end edges of the obtrusion.

The end edges of the opening 11 are met inwardly to provide inwardly directed flanges 18, the purpose of which will presently appear. The front face of the rear wall of the casing and the inner faces of the end walls thereof are threaded to provide reflecting surfaces and through the upper and lower walls, in alignment with the vertical edges of the opening 11, are directed rotatable shafts 19 each having its lower end bent to provide a crank 20 to which is connected one end of an operating cord 21. Through the lower wall of the casing a lamp socket 22 is led having an illuminating element 23 therein. The shafts 19 have each secured thereto a door or closure member 24, the free edge of which is normally maintained in engagement with the adjacent flange 18 by means of a spring 25 connecting the door with the rear wall of the casing. The inner faces of these doors or closures are provided with reflector surfaces, as indicated, so that they provide end wall reflectors while they are in the closed position. These doors seal against the passage of beams of light from the illuminating element 23 into the compartment 26 formed between the end walls of the casing and the closure members 24, so that ordinarily the indicia 13 are not illuminated. Back of these indicia lens sheets 27 of any suitable character are preferably placed, so that the light passing through the indicia openings 13 is given a characteristic coloring.

Through the end walls of the obtrusion 14 a shaft 28 is directed, one end of which is formed with an angular portion or crank 29, this shaft being located adjacent the front wall of the casing. To this shaft is secured a door 30 which in one position thereof engages the rear wall of the obtrusion and seals against the passage of light from the illuminating element 23 into the obtrusion where it would illuminate the indicia 16 thereof. The compartment 31 formed by this door is normally maintained sealed by a spring 32 connecting the crank 29 with the exterior of the front wall of the casing, preferably with an attaching bracket 33 carried by this front wall serving as a means for attaching the signal box to the vehicle. It will be obvious that by shifting a selected door either the signal "Right", "Left" or "Stop" may be given and that these signals are all controlled by a single illuminating element 23. This illuminating element further illuminates the license indicia plate 34 which is supported in channels 35 formed on three edges of the opening 12 and held in position by a removable end edge portion 36. This plate will be perforated, as indicated, to lend a desired significance thereto and will preferably have arranged against the rear face thereof a lens plate 37 formed of translucent material.

A signal of this character may be readily operated by connecting the cranks 20, through the flexible elements 21, to the transverse connecting bar 38 connecting the steering spindle arms 39 of the vehicle to which the signal is applied, these flexible elements being preferably trained over rollers 40 and secured by a common securing element 41 to the connecting bar. Each of the flexible elements will preferably have arranged therein a spring 42 of sufficient strength to shift the shutter operated by the flexible element in which it is arranged against the action of its spring, but which will give to allow of excess movement on the part of the connecting bar 38 without breakage. The operating crank 29 of the shaft 28 is connected, through a similar flexible element 43 having a spring 44 therein, to the brake pedal 45 of the vehicle so that the "Stop" signal is operated upon operation of the brake. It will be obvious that with a signal of this character not only is the signal operated by the use of a single illuminating element, but this operation is obtained without the use of switches and similar electrical fittings and may accordingly be much more cheaply produced.

Certain changes being possible in the construction of this device as hereinbefore set forth without in any manner departing from the spirit of my invention, I do not limit myself to such specific structure except as hereinafter claimed.

I claim:—

A signal light comprising a rectangular compartment having an opening in one side wall thereof of less length than such side wall and arranged centrally of the side wall, the margins of said opening having means for supporting a stencil sheet, the end margins of the opening being formed to provide inwardly projecting flanges, the ends of such side walls at the ends of the opening being perforated to form a stencil sheet, doors pivoted adjacent the opposite side wall of the casing in alignment with the ends of the opening and having their free edges movable into and out of contact with said flanges, means normally maintaining the doors in engagement with the flanges, and means for shifting said doors to place the compartments formed between the ends of the casing and the doors in communication with the central portion of the casing, the central portion of the casing being provided with an illuminating element, the last named wall of the end walls of the casing providing reflecting surfaces, the faces of the doors next adjacent the center of the casing being likewise in the form of a reflecting surface whereby said doors, when in closed position reflect light through said stencil sheet and when in the open position reflect light through the stencil sheets at the ends of the side walls.

In testimony whereof I hereunto affix my signature.

JOHN E. BINNS.